(12) United States Patent
Boyd

(10) Patent No.: US 9,318,031 B2
(45) Date of Patent: Apr. 19, 2016

(54) DEVICE AND METHOD TO PRODUCE GRAVITOMAGNETIC INDUCTION, MASS SPIN-VALVE OR GRAVITATIONAL RECTIFIER

(76) Inventor: Michael Edward Boyd, Soquel, CA (US)

(*) Notice: Subject to any disclaimer, the term of this patent is extended or adjusted under 35 U.S.C. 154(b) by 631 days.

(21) Appl. No.: 13/595,424

(22) Filed: Aug. 27, 2012

(65) Prior Publication Data

US 2014/0170624 A1    Jun. 19, 2014

(51) Int. Cl.
| | |
|---|---|
| H01F 27/42 | (2006.01) |
| H01F 37/00 | (2006.01) |
| H01F 38/00 | (2006.01) |
| G09B 23/06 | (2006.01) |
| H02N 11/00 | (2006.01) |

(52) U.S. Cl.
CPC .............. G09B 23/06 (2013.01); H02N 11/002 (2013.01)

(58) Field of Classification Search
CPC .............................. H02N 11/002; G09B 23/06
USPC .......................................................... 213/22
See application file for complete search history.

(56) References Cited

U.S. PATENT DOCUMENTS

| | | | |
|---|---|---|---|
| 6,073,486 A | 6/2000 | Packard et al. | |
| 6,359,433 B1* | 3/2002 | Gillis et al. | 324/210 |
| 6,956,707 B2* | 10/2005 | Ottesen et al. | 360/25 |
| 7,549,325 B1* | 6/2009 | Yang et al. | 73/105 |
| 8,000,066 B2 | 8/2011 | Mizuno et al. | |
| 8,576,407 B2* | 11/2013 | Flechsig et al. | 356/507 |
| 2003/0002728 A1* | 1/2003 | Takai et al. | 382/141 |
| 2006/0023330 A1* | 2/2006 | Matsui | 360/55 |
| 2009/0168506 A1* | 7/2009 | Han et al. | 365/171 |
| 2013/0202992 A1* | 8/2013 | Chen et al. | 430/5 |

FOREIGN PATENT DOCUMENTS

| | | |
|---|---|---|
| RU | 2007-119-441 A | 11/2008 |
| WO | WO-2010-010434 A1 | 1/2010 |

OTHER PUBLICATIONS

Michael Boyd and Xiaopeng Xu, MR Glide Inspection for Hard Disk Defect Detection, (SPIE vol. 3618), Jan. 1999, pp. 53-64.*
M.L.Ruggicro, A.Tartaglia; "Gravitomagnetic effects;" Dip. Fisica, Politecnico and INFN, Torino, Italy; PACS Nos. 04.20, 04.80; Feb. 3, 2008.

(Continued)

*Primary Examiner* — Rexford Barnie
*Assistant Examiner* — Toan Vu
(74) *Attorney, Agent, or Firm* — Patrick Reilly

(57) ABSTRACT

The invention pertains to a head-disk assembly device, "mass spin-valve" or "gravitational rectifier" and method of producing gravitomagnetic induction utilizing Nano-features; Nano-bumps and Nano-pits; fabricated on the surface of a hard disk. The device includes a computer hard disk; a piezoelectric glide head and/or a GMR read head; a typical hard drive's electronics; wherein, defects are fabricated on the said disk using a Focused Ion Beam (FIB) by depositing requisite number of nanobumps of specified height, and etching equal number of nanopits of specified depth a few mils or mm apart on a pre-decided radius. By spinning the said nano-features disk produce (1) an associated mechanical force utilizing a piezoelectric glide head and/or (2) an associated magnetic force utilizing a GMR read head; for (a) general use in surface characterization work and (b) for producing power by the presence or the absence of matter on a spinning disk.

17 Claims, 16 Drawing Sheets

(56) References Cited

OTHER PUBLICATIONS

Boyd, M., Xiaopeng, X., "MR Glide Inspection for Hard Disk Defect Detection", (SPIE vol. 3619), San Jose, California, U.S. Jan. 1999 pp. 53-64.

Tajmar, M. "Martin Tajmir on Gravitomagnetism", (youtube.com), Sep. 8, 2012: https://www.youtube.com/watch?v=FRb-1WApJKs.
U.S. Appl. No. 12/159,657, filed Jul. 2009, Han et al.
U.S. Appl. No. 11/176,680, filed Feb. 2006, Matsui.
U.S. Appl. No. 13/369,061, filed Aug. 2013, Chen et al.

* cited by examiner

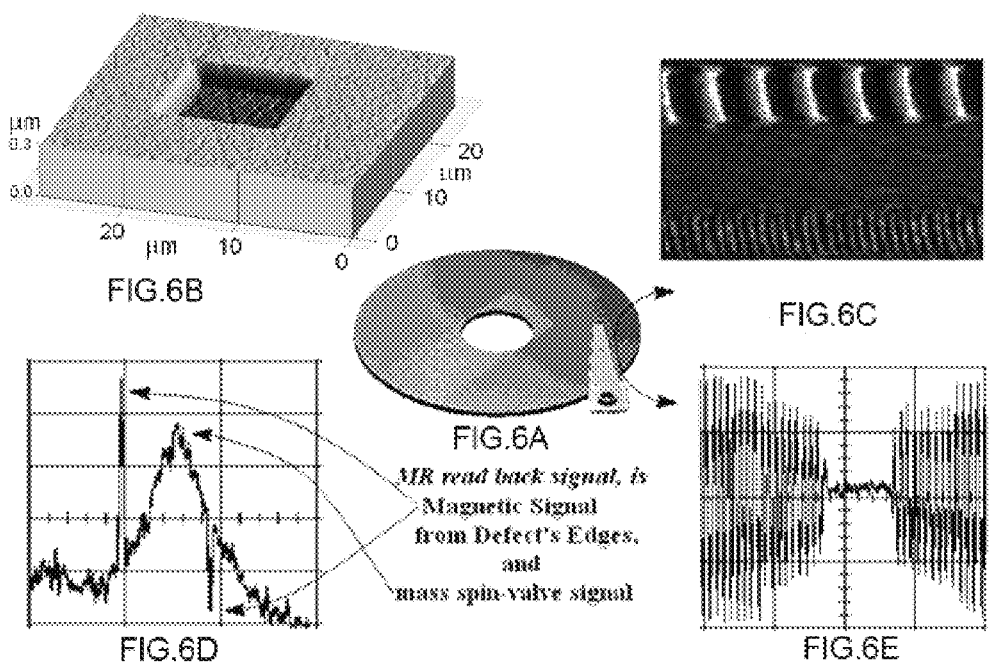

DEVICE AND METHOD TO PRODUCE GRAVITOMAGNETIC INDUCTION, MASS SPIN-VALVE OR GRAVITATIONAL RECTIFIER

FIELD OF THE INVENTION

The present invention relates to a device and method to produce gravitomagnetic induction utilizing a head disk assembly and more precisely utilizing gravitomagnetic induction produced by the Nano-bump or the Nano-pit on the spinning disk that can be used to produce mechanical and electrical energy for work and power.

BACKGROUND OF THE INVENTION

There have been a number of attempts to build gravitomagnetic induction devices, and a small number of reports of gravitomagnetic induction like effects had found a place in scientific literature. But none of the examples that follow are accepted as reproducible examples of gravitomagnetic induction; nor is there any prior art on a device to produce gravitomagnetic induction utilizing a head disk assembly.

Gyroscopes produce a force when twisted that operates "out of plane" and can appear to lift themselves against gravity. Although this force is well understood to be illusory, even under Newtonian models, it has nevertheless generated numerous claims of gravitomagnetic induction devices and any number of patented devices. Perhaps the best known example is a series of patents issued to Henry William Wallace, an engineer at GE Aerospace in Valley Forge, Pa., and GE Re-Entry Systems in Philadelphia. He constructed devices that rapidly spun disks of brass, a material made up largely of elements with a total half-integer nuclear spin. [A "kinemassic field" generator from U.S. Pat. No. 3,626,605: Method and apparatus for generating a secondary gravitational force field.] He claimed that by rapidly rotating a disk of such material, the nuclear spin became aligned, and as a result created a "gravitomagnetic" field in a fashion similar to the magnetic field created by the Barnett effect.

Hayasaka and Takeuchi had reported weight decreases along the axis of a right spinning gyroscope. Tests of their claims by Nitschke and Wilmath yielded null results. A few years later, recommendations were made to conduct further tests. Provatidis and Tsiriggakis have proposed a novel gyroscope equipped by couples of rotating mass particles that draw only the upper (or lower) 180 degrees of a circle, thus producing net impulse per full revolution. This is achieved by transforming the previously used circular orbit into a figure-eight-shaped path (symbol of infinity) of variable curvature that entirely lies on the surface of a hemisphere. Moreover, it was claimed that the spinning of the entire mechanism, in conjunction with the resonance of the centrifugal force through two servomotors, produces antigravity propulsion towards the axis of symmetry of the aforementioned hemisphere. [Antigravity Mechanism, U.S. Patent Application No. 61/110,307 (Filing date: 31 Oct. 2008) In November 2011, Professor Provatidis published a detailed state-of-the-art report.

The Russian researcher Eugene Podkletnov claims to have discovered experimenting with superconductors in 1995, that a fast rotating superconductor reduces the gravitational effect. Many studies have attempted to reproduce Podkletnov's experiment, always to no results.

A paper by Martin Tajmar et al. in 2006 claims detection of an artificial gravitational field around a rotating superconductor, proportional to the angular acceleration of the superconductor.

In July 2007, Graham et al. of the Canterbury Ring Laser Group, New Zealand, reported results from an attempt to test the same effect with a larger rotating superconductor. They report no indication of any effect within the measurement accuracy of the experiment. Given the conditions of the experiment, the Canterbury group concludes that if any such 'Tajmar' effect exists, it is at least 22 times smaller than predicted by Tajmar in 2006. However, the last sentence of their paper states: "Our experimental results do not have the sensitivity to either confirm or refute these recent results [from 2007]".

Referring to FIG. 2A the glide head 200 flies with a pitch angle with the trailing end 208 closer to the surface of the disk than leading edge 206. Due to the pitch angle during flight and because glide head 200 includes trailing end taper 218, the lowest flying point 234 on glide head 200 is moved forward of the trailing end 208, and is at the junction of the air bearing surface 214, 216 with trailing end taper 218.; FIG. 2B, show a bottom plan view and a side view, respectively, of a glide head 200 having side rails with tapered trailing ends. As shown glide head 200 includes first and second rails 202 and 204 that run from the leading end 206 to the trailing end 208 of glide head 200 with a recessed area 222 formed between the two rails 202 and 204. Rails 202 and 204 include a leading end taper 210 and a trailing end taper 218 with air bearing surfaces 214 and 216 disposed between. Also as shown glide head 200, in, including rail 204 and the angle of leading end taper 210 and trailing end taper 218. Recessed area 222 is indicated by a broken line. Glide head 200 is a 50% slider. The term "50%", as is well known in the art, refers to the size of the slider. It should be understood; however, that glide head 200 is not limited to a 50% slider, but may be any size desired.

FIG. 3A illustrates a magnetic head with combined elements of the read and write functions into a single, or a "merged head" using the IBM terminology as well as a writing head. The small, concentrated magnetic field magnetizes, or "turns on", a region on the disk by induction. The gap at the bottom concentrates the field over the disk. When current is applied to generate the magnetic field, the "hard" disk medium is permanently magnetized with a polarity that matches the writing field. Reversing the current reverses the polarity on the disk bit to rewrite or erase the information stored in digital format. A timing clock is synchronized with disk rotation so that the location of the head with the magnetic "bit cells" is precisely known and controlled. Bits represent ones and zeros (reversed magnetic polarity). Although the disk is permanently magnetized, bits are easily reversed, or rewritten, as the head applies an opposite magnetic field produced by simply reversing the coil current. MR and GMR require more precise synchronization since the magnetic domains are smaller. The task of the READ portion of the head is to read the disk data bits. Reading is where the state-of-the-art technology is being applied and where MR and the newest GMR principles are being applied. Both MR and GMR use a somewhat similar head structure. The very thin MR or GMR sensor strips are sandwiched between oppositely biased contact elements and this component is placed between two magnetic shields to reduce stray magnetic fields. MR and GMR head structures are shown. The Soft Adjacent Layer (SAL) is magnetized by the nearby field. The SAL produces a magnetic field that biases the magnetization in the MR element so that its magnetic field angle is shifted to 45°, the optimum angle for this type of sensor. Although reading and writing are independent functions, it is critical to place the write and read heads close together and near the recording medium. Writing heads are therefore fabricated directly onto the spin valve GMR reading heads. The top shield of the GMR sensor becomes the bottom magnetic pole of the writing head as shown in FIG. 3a to form an integrated or merged head design. The GMR head and writing head share one magnetic layer. The efficient integrated Read-Write assembly is referred to as a merged head. The write head may be less than 30 microns above the rapidly spinning disk and the transaction is virtually instantaneous. In future, higher density may require a near-zero gap.

FIG. 3B illustrates one embodiment for a printed circuit board for use in the head-disk assembly. A printed circuit board 400 includes multiple layers including a power plane, ground planes, and signal paths. In general the printed circuit board includes, for operation of the hard disk drive, digital circuits 356, clock 340, analog circuits 360, and control/power and line conditioning 370. A head-disk assembly [HDA] connector 330 connects power and control conductors from the printed circuit for routing to the head-disk assembly. For this embodiment, the ground plane is divided between a digital circuit ground plane 310 and an analog circuit ground plane 320. A clock 340, used to generate data to read and write data in the hard disk drive, is mounted on the printed circuit board 300 and coupled to the digital circuit ground plane 310. Similarly, digital circuits 350 that control the operations of the hard disk drive are also mounted on the printed circuit board and grounded on the digital circuit ground plane 310. Analog circuit 360, which operates on analog signals read from the head-disk assembly, is mounted on the printed circuit ground plane 320. The power and control signals from the analog circuits 360 are input to control/power line conditioning circuits 370 conditioning the power and control signals to reduce noise coupling in the actuator. The conditioned signals are then passed to the HDA connector 330.

FIG. 4 illustrates a glide head or a downward facing merged head mounted on a suspension arm 420 and flying over the surface 424 of a rotating disk 422; disk 422 rotates in the direction of arrow 425. A linear actuator (not shown) controls the radial position of the head 402 with respect to the disk 422 by moving the suspension arm 420 as illustrated by arrow 421.

FIG. 5 illustrates a side view of a downward facing glide head, or a downward facing merged head. It should be understood that typically, the top surface 424A and the bottom surface 424B of disk 422 is utilized at the same time by a downward facing head 402A and an upward facing head 402B, respectively, as shown in the side view illustrated in FIG. 5. Head 402A and 402B are mounted on respective suspension arms 420A and 420B, which are controlled by linear actuator 428. During operation, disk 422 rotates to produce a linear velocity between disk 422 and head 402. The higher linear velocity drives air between the surface 424 of the disk 422 and the head 402, which produces lift on an air bearing surfaces 214 and 216 (ref FIG. 2) of head 402. This, head 402 is said to "fly" over surface 424 of disk 422. As disk 422 rotates, head 402 is moved laterally over a radius of disk 422 by linear actuator 428 (shown in FIG. 5). The lateral movement of the head 402 is slow relative to the rotation of the disk 422. During operation of the mechanical force mass spin-valve device the glide head 402 experiences a mechanical force from Nano-pits or Nano-bumps on the disk 422 surface. Likewise; during operation of the magnetic force mass spin-valve device the merged head 402 experiences a magnetic force produced from Nano-pits or Nano-bumps on the disk 422 surface.

BRIEF SUMMARY OF THE INVENTION

The mass spin-valve or gravitational rectifier is a product/device comprised of a disk containing Nano-features, a piezoelectric glide head and/or a GMR read head in combination with a typical hard drive's electronics. Spin-valve is standard terminology in the hard drive industry. According to the invention, the device to produce gravitomagnetic induction comprising: a computer hard disk; a piezoelectric glide head and/or a GMR read head in combination with a typical hard drive's electronics, wherein, plurality of defects are fabricated on a MR disk using a Focused Ion Beam (FIB) and plurality of nanobumps of specified height were deposited, and plurality of nanopits of specified depth are etched, on a disk a few mils or mm apart on a pre decided radius.

In another aspect of this invention the "mass spin-valve" or "gravitational rectifier" is; by definition; a new type of head disk assembly device, can be utilized to produce gravitomagnetic induction, by utilizing Nano-features fabricated on the surface of a hard disk in combination with a hard drive head to produce an associated mechanical force utilizing a piezoelectric glide head and/or an associated magnetic force utilizing a GMR read head for general use in surface characterization work and for producing power by the presence or the absence of matter on a spinning disk. Specifics of the devices performance are the disk was spinning at a constant linear velocity of 500 inches per second; the GMR resistor was at a constant DC bias of 16 mA; the MR element was around 10 µm long and 10 nm wide; the head was positioned vertically ~51 nm [2 µinches] over the surface of the spinning disk. This phenomenon was validated by the following experiment and a brief summary is given below.

Nano-features; Nano-bumps and Nano-pits; are terms of art for nanotechnology. Nanotechnology is the ability to manipulate matter at the atomic or molecular level to make something useful at the nano-dimensional scale. A head disk assembly is configured involving fabricating Nano-features product/device; Nano-bumps and Nano-pits; fabricated on the surface of a hard drive magnetic media disk. Fourteen defects were fabricated on a 2400 Oe 31.5 mil 95 mm MR disk using a Focused Ion Beam (FIB). Seven bumps of ~1.25 µin (~32 nm) height were deposited, and seven pits ~2 µin (~51 nm) deep were etched, on a disk 50 mils (~1.27 mm) apart on a radius, as shown in FIG. 1. The specified areal dimensions were 40×40, 20×20, 10×10, 6×6, 4×4, 2×2 and 1×1 µm² respectively.

Following fabrication, the disk was placed on the spindle of an MG250 and magnetically erased using a wide track MIG inductive head. The disk was then scanned using a 50% slider with a piezoelectric crystal mounted on the side of one of the sliders (i.e., a Piezo Glide or Glide head) and the disk was measured for mechanical force signal from the piezoelectric Glide head. The MG250 Read channel was then used with a 50% Slider GMR head containing a magnetized MR element. The MR current was optimum at 16 mA, and the linear velocity was maintained at 500 inches per second (ips) [unless otherwise noted]. Both the Glide head and the MR head was moved to the approximate location of the defect under analysis, and then stepped on a radius until a signal was detected on a Lecroy LC920 Oscilloscope. The signal was then optimized for maximum signal level. The maximum signal was then recorded and characterized for signal amplitude and timing characteristics. The maximum signal measured was recorded and characterized for both MR modulation and mass spin-valve signal amplitudes and timing characteristics. The disk was then removed and each individual defect was characterized utilizing a Park Scientific AFM for defect width along the direction of the circumference as reported in Table 1 in the detailed description of my invention.

GMR is the conventional acronym for "giant magneto-resistive" in terminology of the hard disk drive storage technology. The term is usually referred to in reference to GMR heads. GMR heads are termed "giant", not because of their size, but for the giant magneto-resistive effect, first discovered by the European researchers Peter Gruenberg and Albert Fert in the late 1980s. While working with large magnetic fields and thin layers of magnetic materials, Gruenberg and Fert noticed that very large resistance changes when these materials were subjected to magnetic fields. Disk drives that are based on GMR head technology use these properties to help control a sensor that responds to very small rotations on the disk. The magnetic rotation yields a very large change in sensor resistance, which in turn provides a signal that can be picked up by the (electric circuits) sensitive amplifiers in the drive.

Passing over a fixed magnetic field, the electrons in the free layer of the GMR head turn to align with those on the fixed field, creating a lowered resistance in the head structure. When the head passes over a field of opposite polarity, the free layer electrons in the GMR head rotate so that they are not aligned with the electrons on the fixed field. This causes an increase in the structure's resistance. Because resistance changes in the GMR head are caused by changes to the spin characteristics of electrons in the free layer, GMR heads are also known as "spin valves", a term coined by IBM.

The observed MR modulation read back signal corresponds to the switch in magnetization polarity produced by the edges of the bumps and pits. The product of the time change between the positive and negative magnetic transition modulation pulses times the linear velocity scales to within 200 nm of the defects width along the circumference as measured with an atomic-force microscope (AFM). (1) It was observed that [mass spin-valve] "MS signal" is the central peak offset voltage whose offset voltage is dependent on the type of defect and its size. (2) It was observed that the polarity of the MR magnetic modulation signal induced by a micro-fabricated defect is dependent on the polarity of DC erase on the MR media but the MR mass spin-valve signal (or "MS" signal) is independent of the polarity of DC erase. Glass substrates uncoated with magnetic recording materials [not shown] are textured with YAG laser bumps in the head landing zone to enable the reliability of the head disk assembly. These non-magnetic media coated disks where scanned with the GMR head used in this invention to (3) verify the independence of the gravitomagnetic induction field from the magnetic field direction dependent MR magnetic modulation signals to the polarity of the media's magnetization since no electromagnetic signals where observed where magnetic media was not present.

The pits on the spinning disk produce a positive upward force; as shown. This was verified using a type of force meter for hard disk defects called a piezoelectric [PZT] glide head. The bump defects produced a downward force which was also verified with a PZT Glide head.

The GMR head was used to specifically quantify the measured gravitational induction signals by measuring the defects with a magnetic force microscope [MFM] to calibrate the force in units of [nano] Newtons on $10 \times 10$ $\mu m^2$ pit defect that was 200 nm deep.

Specifics of the devices performance are the disk was spinning at a constant linear velocity of 500 inches per second; the GMR resistor was at a constant DC bias of 16 mA; the MR element was around 10 μm long and 10 nm wide; the head was positioned vertically ~51 nm [2 μinches] over the surface of the spinning disk.

A 2 Volt gravitational induction signal amplitude is equivalent to a 2 nNewton force as measured with an MFM.

BRIEF DESCRIPTION OF THE DRAWINGS

The above and other features, aspects, and advantages of the present invention will become better understood with regard to the following description, with reference to accompanying drawing/figures:

FIGS. 6A, 6B, 6C, 6D and 6E illustrate the mass spin-valve device and FIG. 6A a typical head disk assembly; FIG. 6B a Nano-pit's associate atomic force micrograph [AFM]; FIG. 6C a typical written hard disk's magnetic force micrograph [MFM]; FIG. 6D Nano-pit's mass-spin valve read back signal; and FIG. 6E Nano-pit's mass-spin valve read back signal with data written on the disk which is also known as a disk drive certifier missing pulse test;

FIG. 9 illustrates the typical magnetic induction and gravitational induction characteristic for the same Nano-bump's mass-spin valve read back signal;

DETAILED DESCRIPTION OF THE INVENTION

The surface of the typical magnetic media hard disk contains a thin diamond like coating of 1 nm or less over the deposition of 10-20 nm thick layer of ferromagnetic perpendicular materials cobalt and platinum and Chromium (Cr) the invention are described with particular reference to the drawings.

Figure 1:
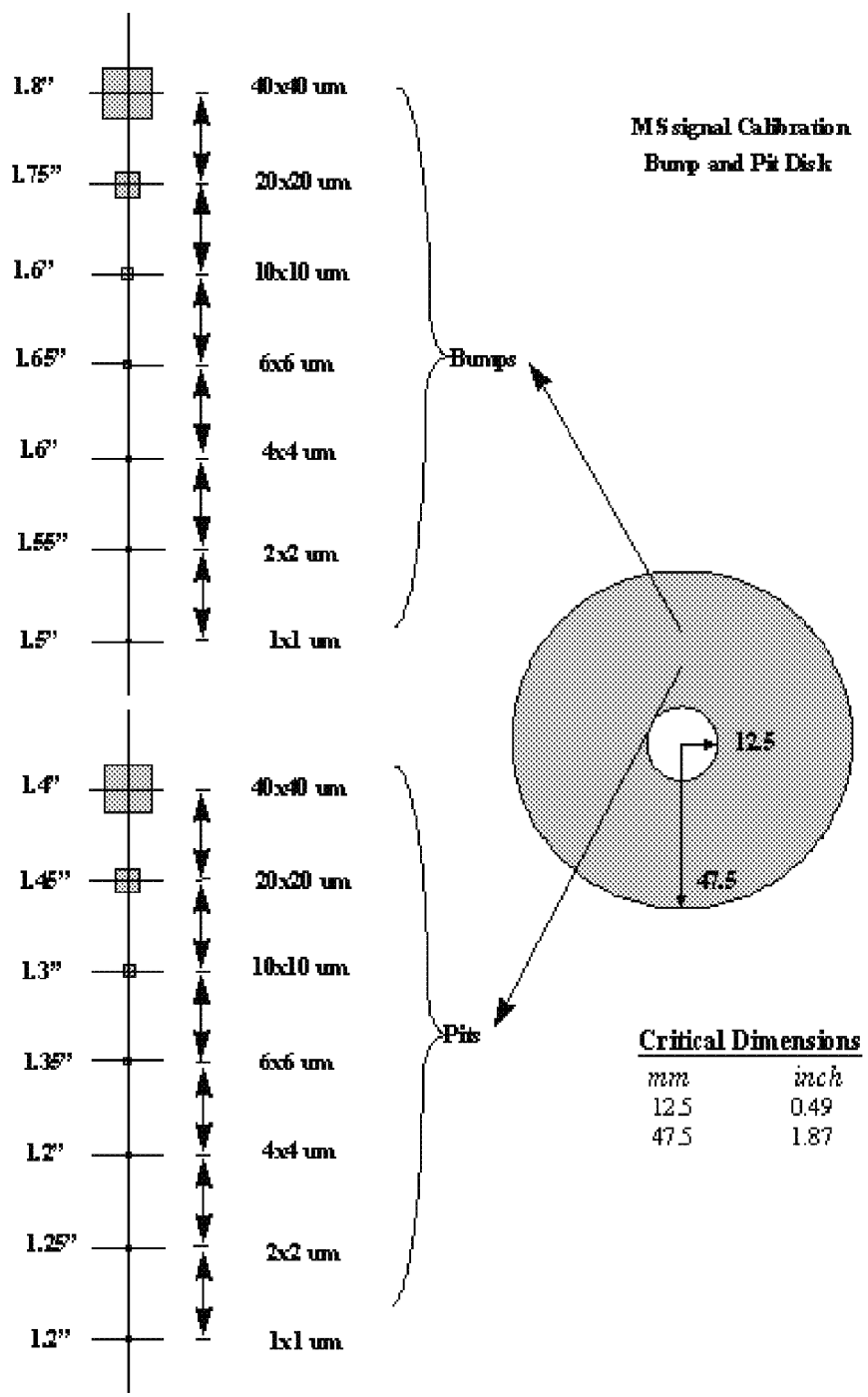
FIG. 1 illustrates the top view of the Nano-features fabricated on the surface of a hard drive disk using a focus ion beam.
Figure 2A:
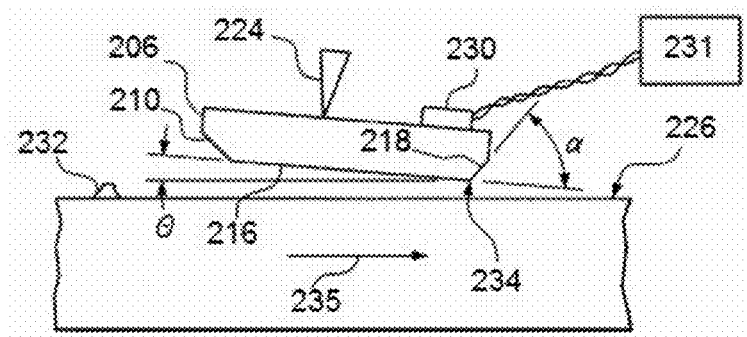
FIGS. 2A and 2B illustrate a bottom plan view and the side view of a conventional piezoelectric [PZT] glide head.
Figure 2B:
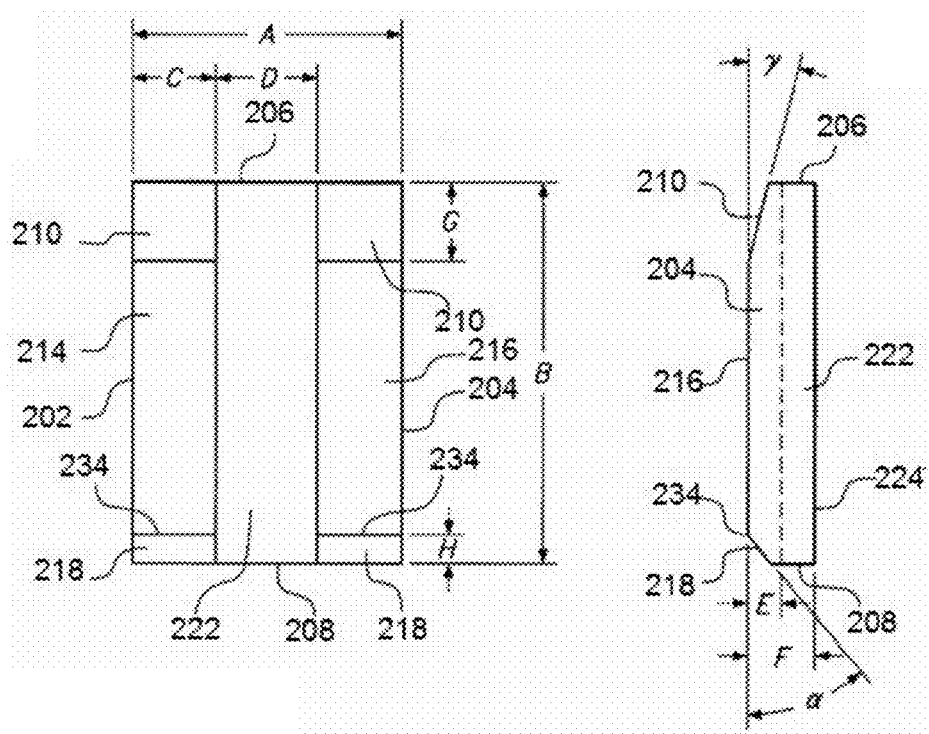
Figure 3A:
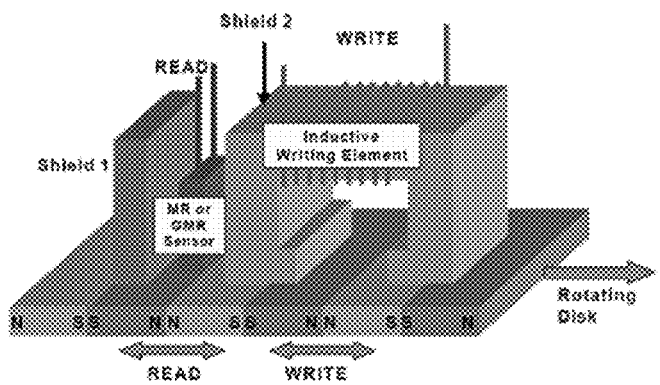
FIG. 3A illustrates magnetic head with combine elements of the read and write functions into a single, or a "merged head" using the IBM terminology; and 3B illustrates one embodiment for a printed circuit board for use in the head-disk assembly.
Figure 3B:
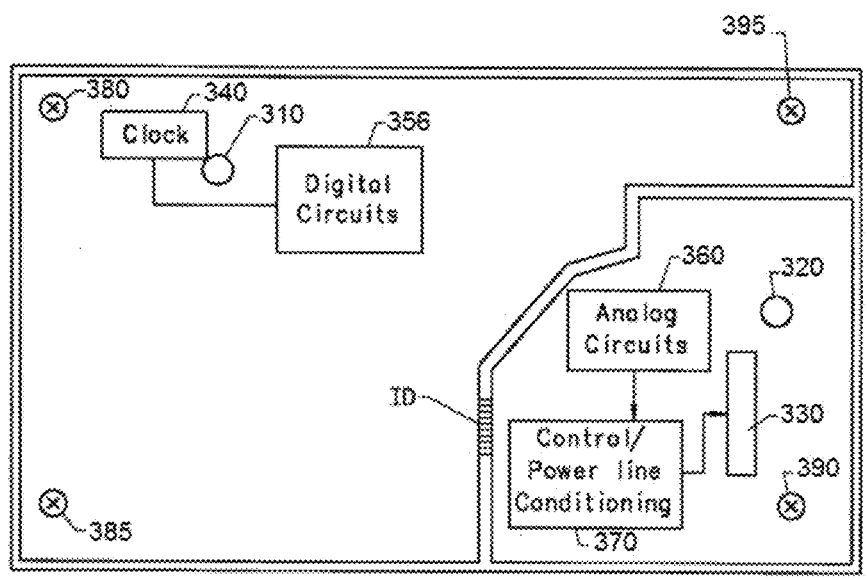
Figure 4:
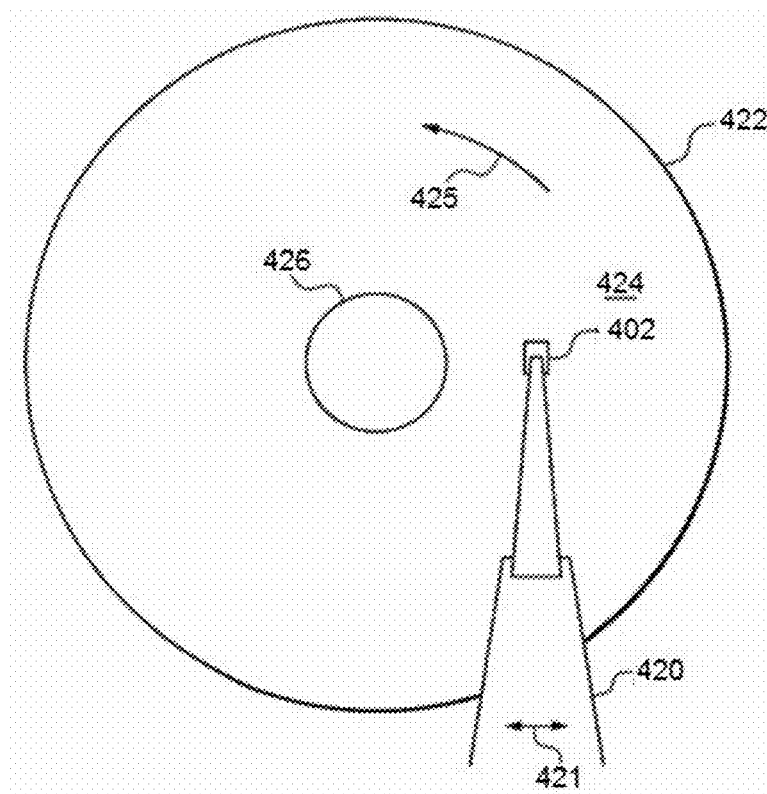
FIG. 4 illustrates a conventional glide head mounted on a suspension arm and flying over the surface of a rotating disk.
Figure 5:
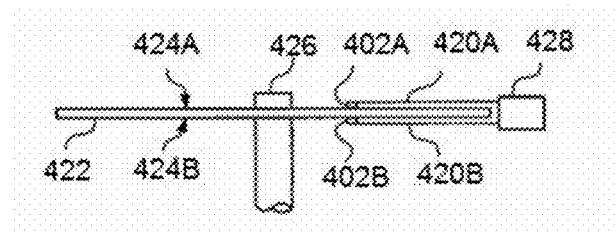
FIG. 5 illustrates a side view of a downward facing conventional glide head, or a downward facing conventional merged head.

FIG. 1 is a top view of the fourteen defects fabricated on a 2400 one 31.5 mil 95 mm MR disk using a Focused Ion Beam (FIB). Seven bumps of ~1.25 μin (~32 nm) height were deposited, and seven pits ~2 μin (~51 nm) deep were etched, on a disk 50 mils (~1.27 mm) apart on a radius, as shown. The specified areal dimensions were 40×40, 20×20, 10×10, 6×6, 4×4, 2×2 and 1×1 μm² respectively. Following fabrication the disk was placed on the spindle of an MG250 and erased using a wide track MIG inductive head. The disk was then scanned using a 50% slider with a piezoelectric crystal mounted on the side of one of the sliders (i.e., a Piezo Glide or Glide head) and the disk was measured for mechanical force signal from the piezoelectric Glide head. The MG250 Read channel was then used with a 50% Slider MR head containing a magnetized MR element. The MR current was optimum at 16 mA, and the linear velocity was maintained at 500 inches per second (ips) [unless otherwise noted].

Both the Glide head and the MR head was moved to the approximate location of the defect under analysis, and then stepped on a radius until a signal was detected on a Lecroy LC920 Oscilloscope. The signal was then optimized for maximum signal level. The maximum signal was then recorded and characterized for signal amplitude and timing characteristics. [R. D. Hemstead, *IBM J. Res. & Dev.*, Vol. 18, p547, 1974]. The maximum signal measured was recorded and characterized for both MR modulation and mass spin-valve signal amplitudes and timing characteristics. The disk was then removed and each individual defect was characterized utilizing a Park Scientific AFM for defect width along the direction of the circumference as reported in Table 1.

TABLE 1

| Design Width (μm) | Defect Type | AFM Width (μm) | AFM Height or Depth (μin/nm) | MR Modulation Pulse Delay(μSec) | MR Modulation Delay × Velocity (μm) | MR mass spin-valve Signal Maximum Ampl(Vp) Anti-$G_{Force}$ (nNewtons) | MR mass spin-valve Signal Minimum Ampl(Vp) $G_{Force}$ (-nNewtons) | Expected normal Gravity Force Bump Volume × 19.3 g/cm³ density of W (-nNewtons) |
|---|---|---|---|---|---|---|---|---|
| 40 | Bump | 40.9 | 1.27/32.3 | 3.23 | 41.021 | NA | -2 | -0.00010630 |
| 20 | Bump | 20.2 | 1.22/31 | 1.6 | 20.3 | NA | -0.805 | -0.00002489 |
| 10 | Bump | 10.9 | 1.27/32.3 | 0.858 | 10.8966 | NA | -0.304 | -0.00000755 |
| 6 | Bump | 6.56 | 1.22/31 | 0.518 | 6.5786 | NA | -0.185 | -0.00000262 |
| 4 | Bump | 4.76 | 1.24/31.5 | 0.38 | 4.826 | NA | -0.14 | -0.00000140 |
| 2 | Bump | 2.8 | 1.04/26.4 | 0.218 | 2.7686 | NA | -0.065 | -0.00000041 |
| 1 | Bump | 2.4 | 1.05/26.7 | 0.19 | 2.413 | NA | -0.04 | -0.00000030 |
| 40 | Pit | 42.2 | 1.7/43.2 | 3.31 | 42.037 | 0.378 | NA | NA |
| 20 | Pit | 20.4 | 1.99/50.5 | 1.59 | 20.193 | 0.287 | NA | NA |
| 10 | Pit | 10.3 | 2.02/51.3 | 0.814 | 10.3378 | 0.245 | NA | NA |
| 6 | Pit | 6.28 | 1.92/48.8 | 0.498 | 6.3246 | 0.163 | NA | NA |
| 4 | Pit | 4.25 | 1.59/40.4 | 0.34 | 4.318 | 0.141 | NA | NA |
| 2 | Pit | 2.4 | 1.65/41.9 | 0.208 | 2.6416 | 0.102 | NA | NA |
| 1 | Pit | 1.28 | 1.86/47.2 | 0.104 | 1.3208 | 0.055 | NA | NA | over a ~1 μm thick nickel phosphorus (NiP) layer deposited on an aluminum substrate that has been polished to a roughness of less than 1 Å.

A Focused ion beam, also known as FIB, is a technique used particularly in the semiconductor and materials science fields for site-specific analysis, deposition, and ablation of materials. A FIB setup is a scientific instrument that resembles a scanning electron microscope (SEM). However, while the SEM uses a focused beam of electrons to image the sample in the chamber, an FIB setup instead uses a focused beam of ions. FIB can also be incorporated in a system with both electron and ion beam columns, allowing the same feature to be investigated using either of the beams. Now some of the preferred embodiments of the device and process under Scaling up the power density based on the read-back signal for a 40.9×40.9 μm² Nano-bump [for example] on the spinning disk produces a 2 Volts signal times 16 mA DC current on the MR resistor or 0.032 Watts of power/40.9×40.9 μm²; which is equivalent to a novel power density of about 20 Megawatts/meter². In another words, a spinning disk sized large enough [scaled-up] to contain sufficient 40.9×40.9 μm² Nano-bumps to cover a surface area of one square meter would produce about 20 Megawatts/meter².

Figure 7A:
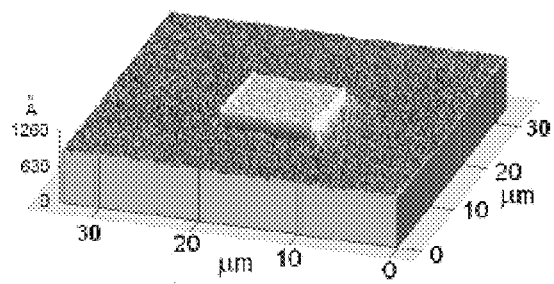
FIGS. 7A, 7B, and 7C illustrate a Nano-bump's associate AFM; a typical PZT glide read back signal; and the same Nano-bump's mass-spin valve read back signal respectively.
Figure 7B:
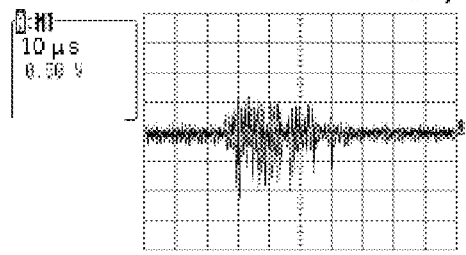
Figure 7C:
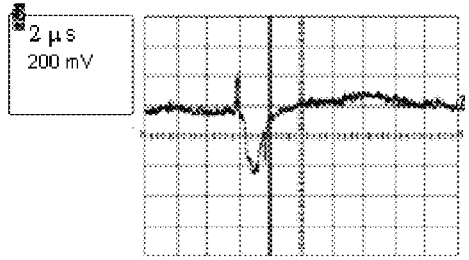

FIGS. 6A, 6B, 6C, 6D and 6E illustrate the mass spin-valve device; 6A is a typical head disk assembly; in 6B, an AFM micrograph from a 10 μm×10 μm area pit is shown; in 6C a MFM micrograph of a written track from a typical hard disk is shown. A MR read back signal from a magnetically erased disk and a certification missing pulse test reading for the same 10 μm×10 μm area Nano-pit are shown in 6D and 6E respectively;

FIG. 7A illustrates a Nano-bump's associate AFM micrograph; FIG. 7B a typical PZT glide read back signal; and FIG. 7C the same Nano-bump's mass-spin valve read back signal. It is shown that the MS signal of bump defects exhibited a negative polarity pulse as shown in FIG. 7B. FIG. 7C shows that for a 1.25 μin (~32 nm) 10 μm×10 μm bump measured with an AFM produces a characteristic PZT Glide signal [measured at 890 ips] of the downward force of the bump on the downward facing head slider and a characteristic mass spin-valve signal of a bump (labeled as non-contact MS-valve signal).

Figure 8A:
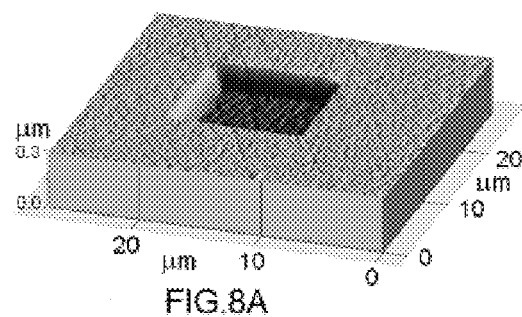
FIGS. 8A, 8B, and 8C illustrate a Nano-pit's associate AFM; a typical PZT glide read back signal; and the same Nano-pit's mass-spin valve read back signal respectively.
Figure 8B:
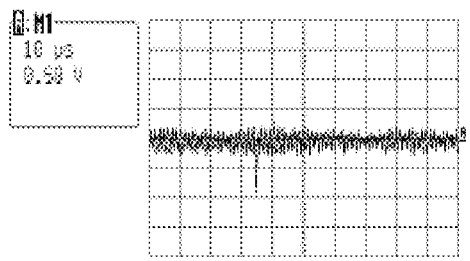
Figure 8C:
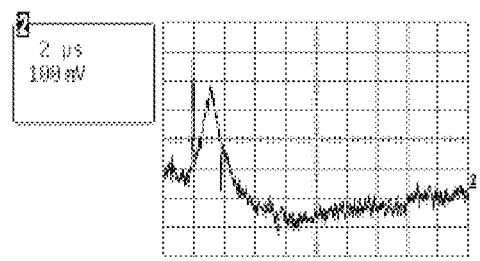

FIG. 8A, FIG. 8B and FIG. 8C illustrates a Nano-pit's associate AFM; a typical PZT glide read back signal; and the same Nano-pit's mass-spin valve read back signal respectively. FIG. 8B illustrates that for ~2 μin 10 μm×10 μm pit measured with an AFM produce a PZT Glide signal [measured at 890 ips] and the characteristic mass spin-valve signal of a pit. The mass spin valve signal of Nano-pit defect exhibited a positive polarity pulse as shown in FIG. 8C.

FIG. 9 illustrates the typical magnetic induction and gravitational induction characteristic for the same Nano-bump's mass-spin valve read back signal. FIG. 9 illustrates that a 10 μm×10 μm Nano-bump exhibits two electromagnetic signals due to electromagnetic induction created by the edges of the bump defect following Maxwell's right hand rule and also exhibits the gravitational induction signal of 0.304 Volts, or 0.304 nNewtons of negative magnetic force. [Maxwell's right-hand rule (RHR): If the conductor is held with the right hand such that the thumb points in the direction of the current flow I, the fingers circling the conductor point in the direction of the magnetic flux lines.]

Figure 10:
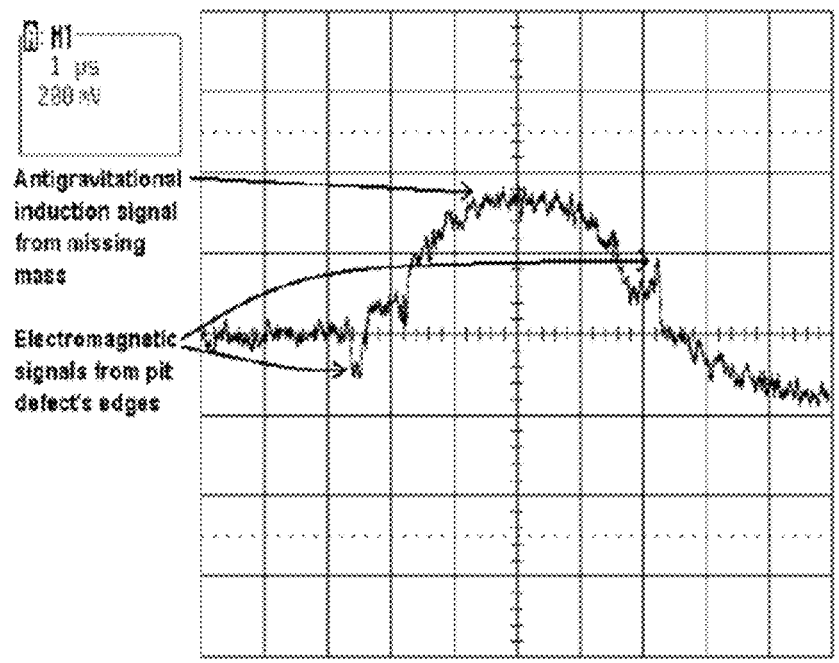
FIG. 10 illustrates the typical magnetic induction and gravitational induction characteristic for the same Nano-pit's mass-spin valve read back signal.

FIG. 10 illustrates the typical magnetic induction and gravitational induction characteristic for the same Nano-pit's mass-spin valve read back signal. FIG. 10 illustrates that a that 40 μm×40 μm Nano-pit exhibits two electromagnetic signals due to electromagnetic induction created by the edges of the pit defect and also exhibits the gravitational induction signal of 0.378 Volts with an equivalent [upward] force of $0.378 \times 10^{-9}$ Newtons produced by $7.69 \times 10^{-17}$ m$^3$ of missing mass. This novel upward [anti-]gravitational force [see Table 1] is not predicted by any known theory.

Figure 11:
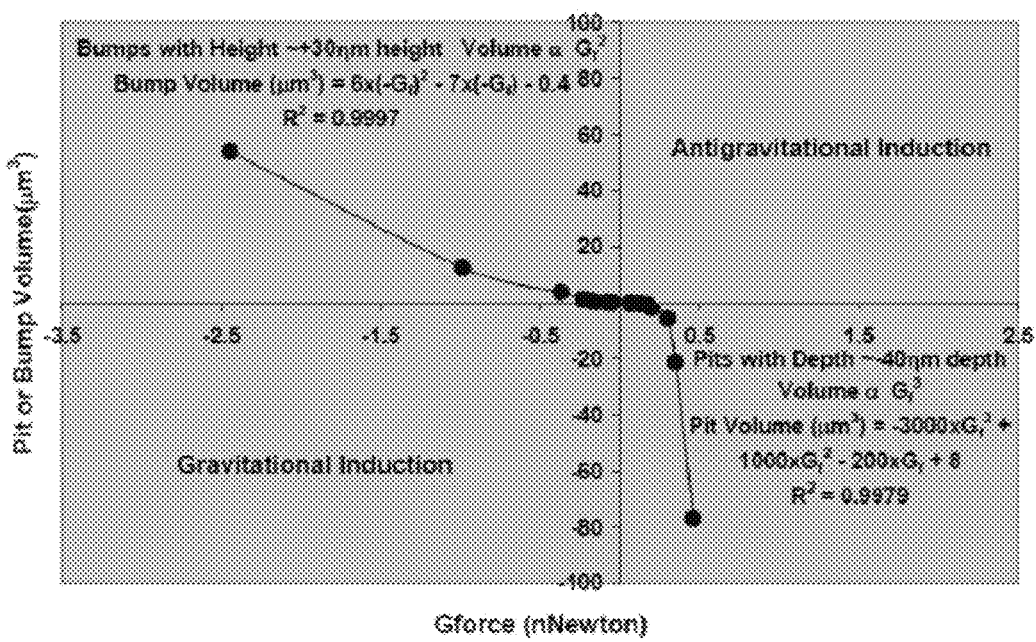
FIG. 11 illustrates the quantum gravitational characteristics of pit or bump volume versus gravitational force rectification in the mass spin-valve device.

FIG. 11 illustrates the quantum gravitational characteristics of pit or bump volume versus gravitational force rectification in the mass spin-valve device.

In a metallic conductor, current is carried by the flow of electrons. In semiconductors, current is often schematized as being carried either by the flow of electrons or by the flow of positively charged "holes" in the electron structure of the material. There exists an equivalent quantum nature to gravity associated with the presence and absence of matter on the spinning disk to the quantum nature in electromagnetism in the semiconductor junction [or a rectifier] as a type electromagnetic spin valve device which is based on the spin of conduction energy band electrons in the semiconductor crystal. FIG. 11 illustrates the gravitational induction equivalent of the semiconductor; as a gravitational rectifier in the mass spin valve device; whereby the downward gravitational induction force [N type donor gravitons] is produced by additional mass; equivalent to the electrons in the semiconductor rectifier; and the upward gravitational induction force [P type acceptor anti-gravitons] is produced by the absence of mass, equivalent to "holes" in the semiconductor rectifier.

Figure 12A:
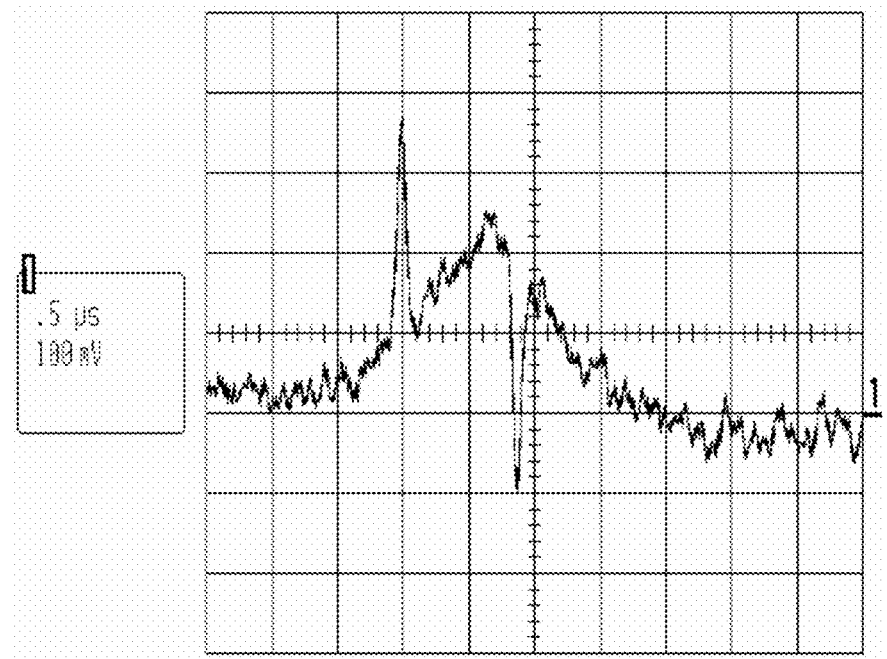
FIGS. 12A and 12B illustrate the magnetic induction is independent from the gravitational induction in the mass spin-valve device.
Figure 12B:
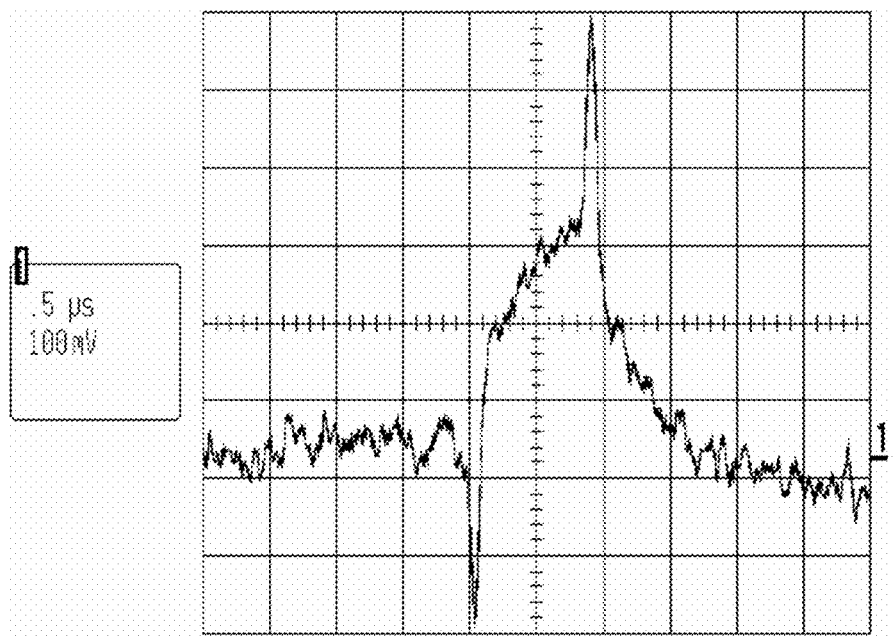

The relationship of mass to normal gravity is described by the relationship [additional mass] Bump Volume (μm$^3$)= $6(-G_f)^2 - 7(-G_f) - 0.4$ [where $G_f$ is the [−] attractive force of Gravity] which is a parabolic force field which has two mathematically real factors. [See FIG. 11] Assuming the Gravitational induction force $(-G_f)$ is variable x and the volume of additional mass is y. Solving for y=0, by simplifying the equation by multiplying both sides with 5, gives two real factors $x_1$ and $x_2$: $x_1=1.221255$ $x_2=-0.054589$. Repulsive [+] anti-gravity exists in hyperbolic force field with one real part and two imaginary factors [relative to the MR sensor] described by the relationship [missing mass] Pit Volume (μm$^3$)=$-3000G_f^3+1000G_f^2-200G_f+8$. [See FIG. 11] Assuming the anti-gravitational induction force $(G_f)$ is variable x and the volume of missing mass is y, then $y=-3000x^3+1000x^2-200x+8=8(-375x^3+125x^2-25x+1)$ and $(-375x^3+125x^2-25x+1)$ the factors are two imaginary one real. Solving for y=0 gives: $x_1=0.0510251$ $x_2=0.141154+0.179826*i$ $x_3=0.141154-0.179826*i$ FIGS. 12A and 12B illustrate the magnetic induction is independent from the gravitational induction in the mass spin-valve device. To examine the dependence of the measured MR mass spin-valve signal on DC erase polarity, the two wires connected to the write transducer were disconnected, and re-attached to the head's paddle board for the opposite polarity to be applied to the write element during erasure. FIG. 12A illustrates the results at one erase polarity. FIG. 12B illustrates that at the opposite erase polarity, the two MR modulation read back signals corresponding to the switch in the electro-magnetic field's direction produced by the edges of the falling and rising edges of the pit induced by a micro-fabricated defect is dependent on the polarity of DC erase on the MR media; but the MR mass spin-valve signal (i.e., the gravitomagnetic force field's direction) is independent of the polarity of DC erase.

Figure 13:
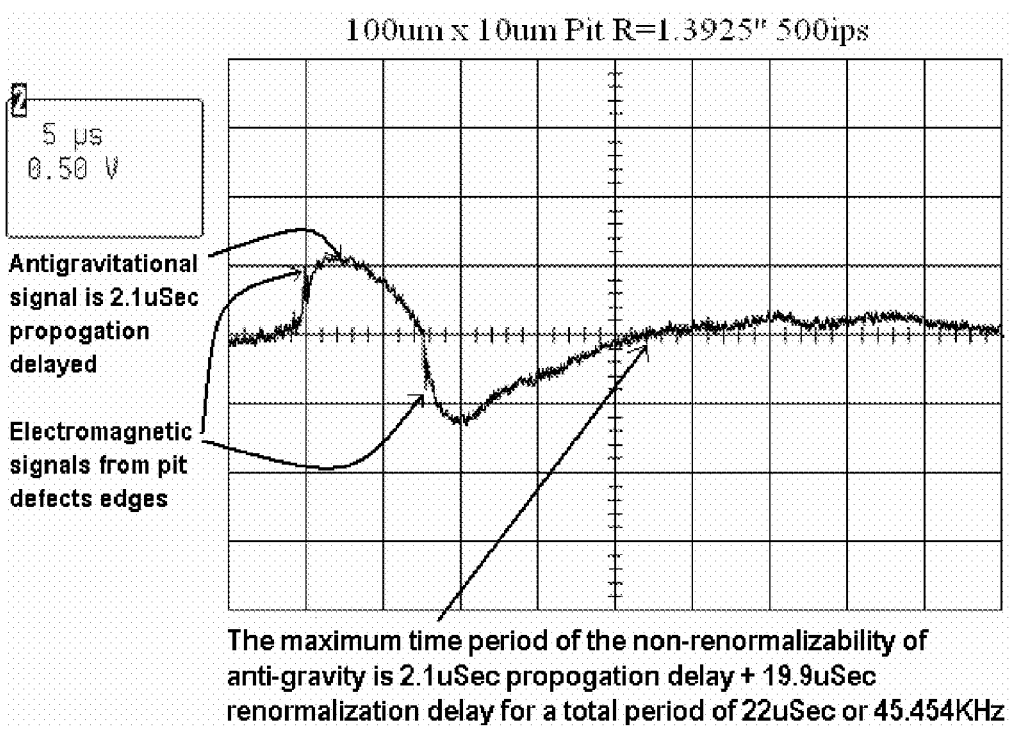
FIG. 13 illustrates the time band gap between gravity and electromagnetism in the mass spin-valve device.

FIG. 13 illustrates the time band gap between gravity and electromagnetism in the mass spin-valve device. FIG. 13 illustrates the time band gap between gravity and electromagnetism; is about 22 μSec. FIG. 13 illustrates that within the gravitational rectifier device that time has a "band-gap"; much like the semiconductor again; where that time band-gap depends on the Nano-feature's "gravitomagnetic energy" or "mass-energy" plus "electromagnetic energy" relative to the merged head 402.

Figure 14A:
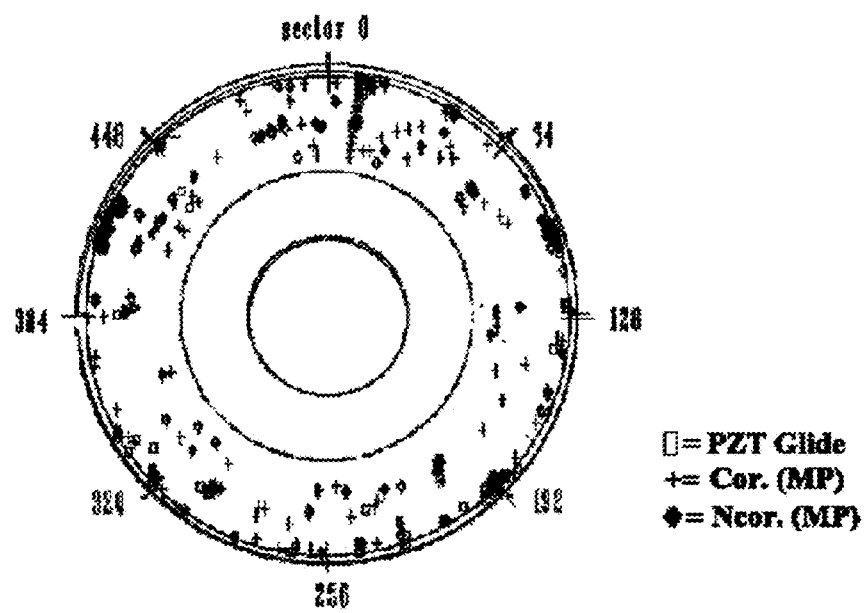
FIGS. 14A and 14B illustrate current piezoelectric glide defect detection utilized on industrial hard disk certifiers and certifier missing pulse defect detection and correction algorithms; and the detection of the mass spin-valve signal, labeled as MS signal, in comparison to the certifier missing pulse defect detection and correction algorithms; on a Nano-features disk prototype.
Figure 14B:
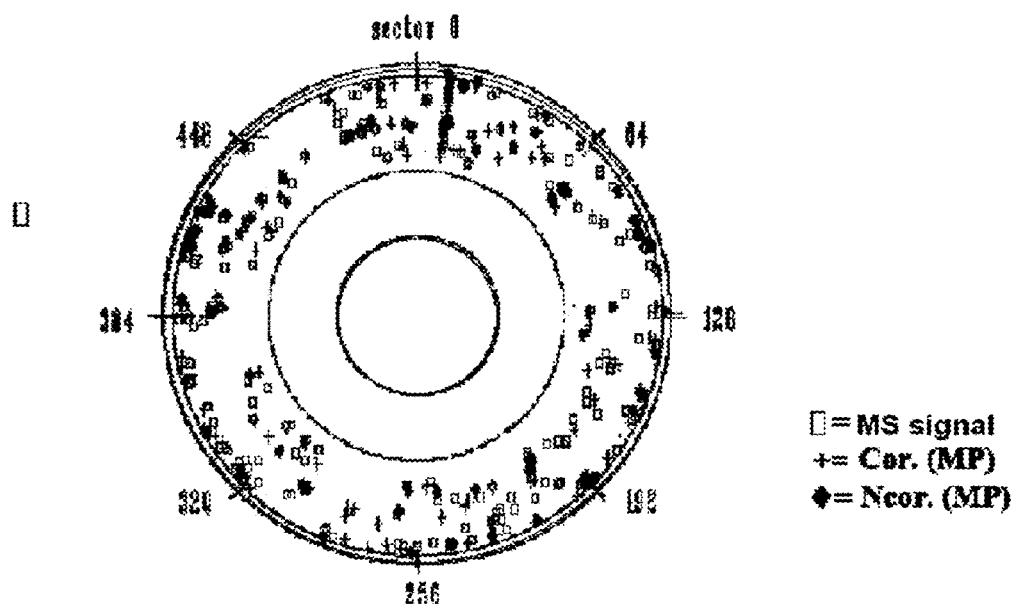

FIGS. 14A and 14B illustrate current piezoelectric glide defect detection utilized on industrial hard disk certifiers and certifier missing pulse defect detection and correction algorithms; and the detection of the mass spin-valve signal, labeled as MS signal, in comparison to the certifier missing pulse defect detection and correction algorithms; on a Nano-features disk prototype. FIG. 14A illustrates that the current piezoelectric glide defect detection utilized on industrial hard disk certifiers is unable to detect pit type defects while certifier missing pulse defect detection and correction algorithms are able to detect both type defects (i.e., pits and bumps) fabricated on a 2400 Oe 31.5 mil 95 mm MR disk using a FIB. FIG. 14B illustrates a high degree of correlation between in the detection of the mass spin-valve signal, labeled as MS signal, and the certifier missing pulse defect detection and correction algorithms utilized by in industrial hard disk certifiers.

Figure 15A:
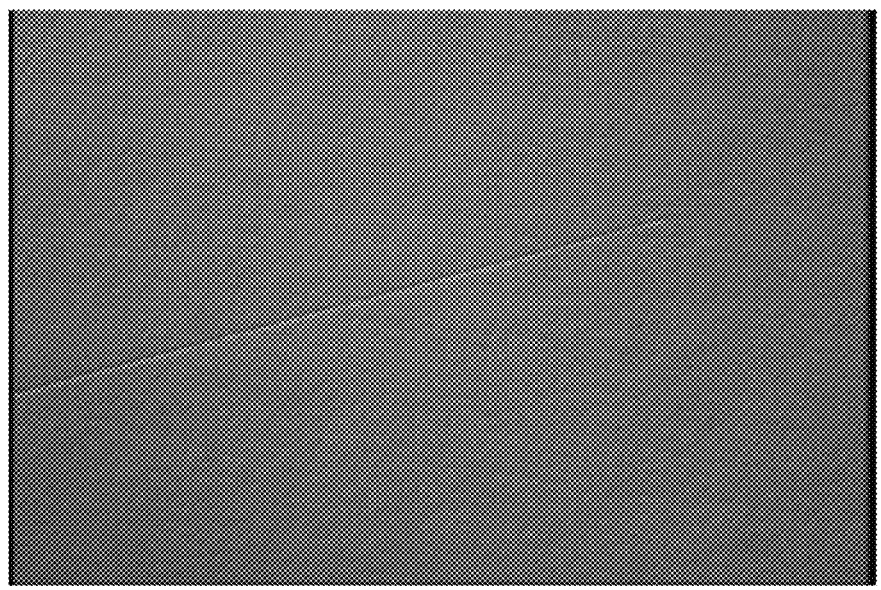
FIG. 15A shows a photograph of a scratch type defect on the prototype hard disk's surface and FIG. 15B illustrates the typical mass-spin valve read back signal.
Figure 15B:
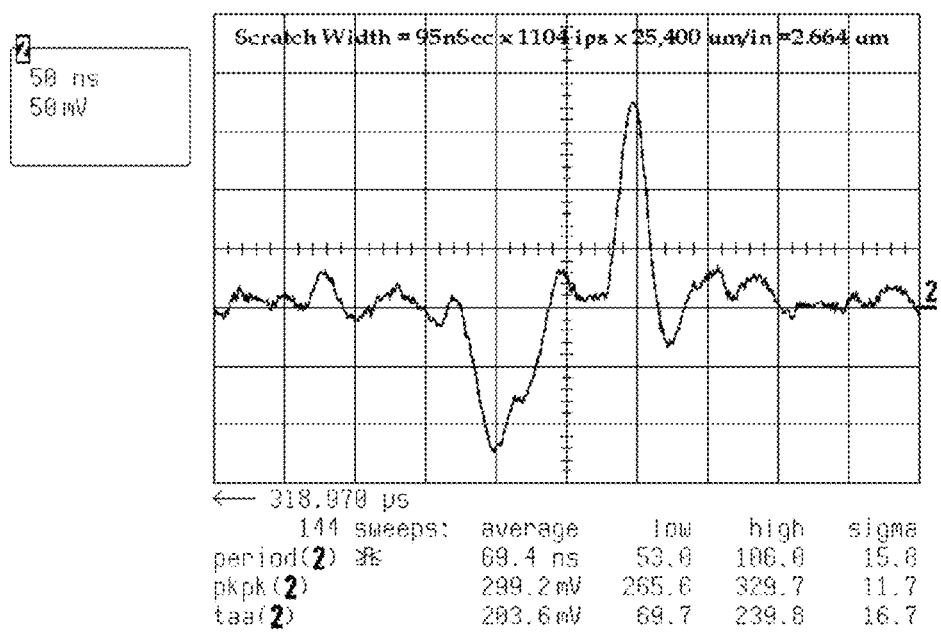

FIG. 15A shows a photograph of a scratch type defect on the prototype hard disk's surface and 15B illustrates the typical mass-spin valve read back signal. FIGS. 15A and 15B illustrate the application of the product/device for a scratch type defect on the disk's surface. The mass spin-valve signal is labeled as non-contact MS-valve signal. The mass spin-valve signal exhibits magnetic transition pulses from the scratch defect's edges only.

Figure 16A:
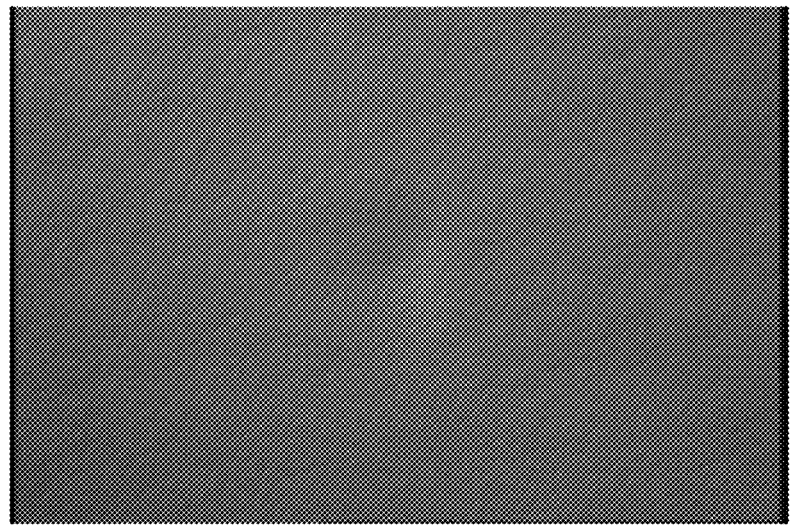
FIG. 16A shows a photograph of a shallow pit type defect on the prototype hard disk's surface and FIG. 16B illustrates the typical mass-spin valve read back signal.
Figure 16B:
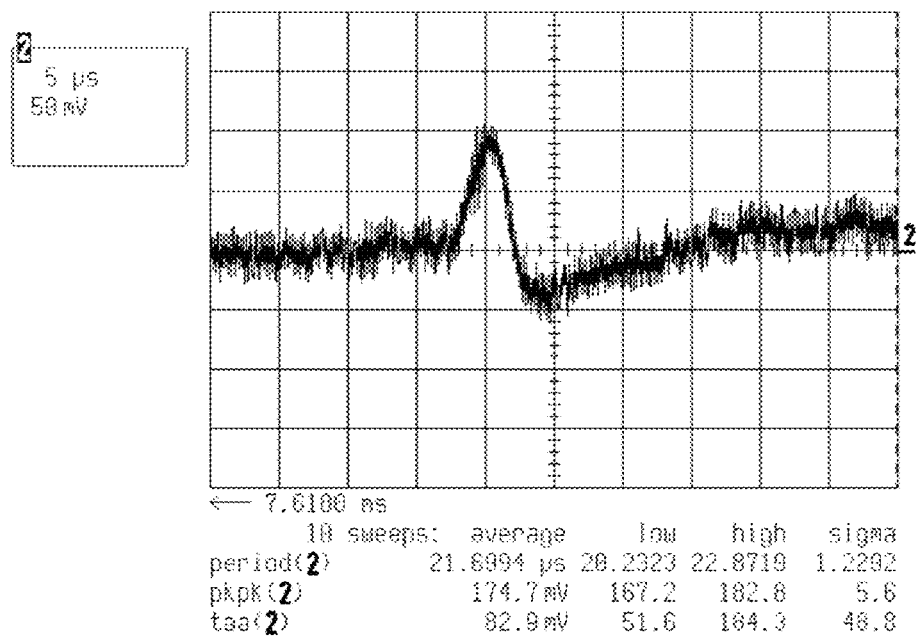

FIG. 16A shows a photograph of a shallow pit type defect on the prototype hard disk's surface and FIG. 16B illustrates the typical mass-spin valve read back signal. FIGS. 16A and 16B illustrate the results from a shallow pit type defect on the disk surface. The read back signal exhibits mass spin-valve signal with no MR magnetic modulation signal present from the defect's edges, but the characteristic polarity mass spin-valve signal of a pit.

Figure 17A:
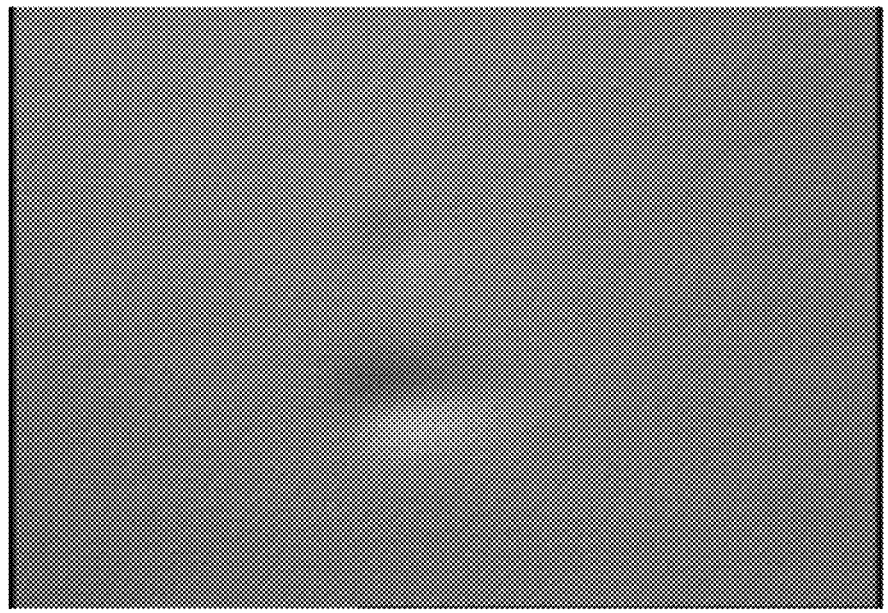
FIG. 17A shows a photograph of a short bump type defect on the prototype hard disk's surface and FIG. 17B illustrates the typical mass-spin valve read back signal.
Figure 17B:
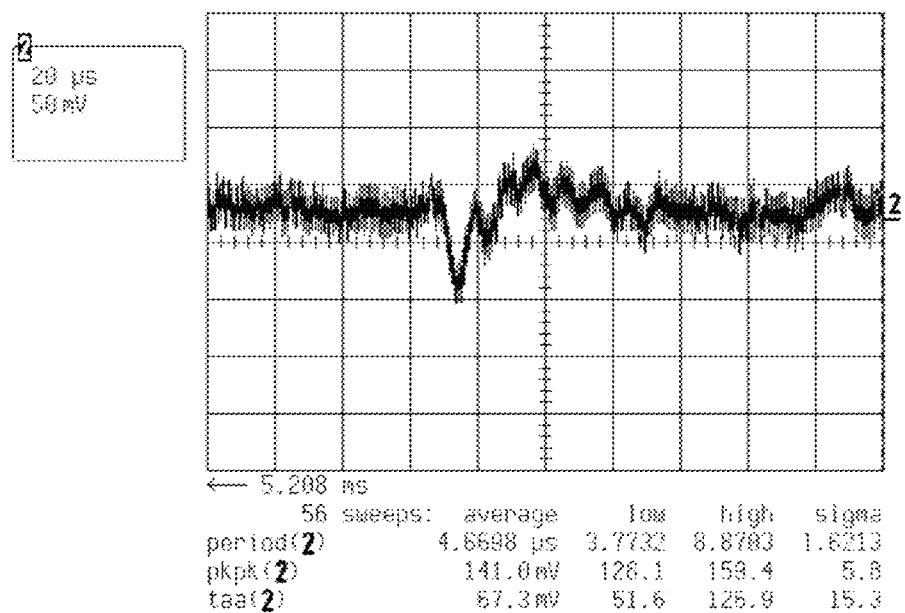

FIG. 17A shows a photograph of a short bump type defect on the prototype hard disk's surface and FIG. 17B illustrates the typical mass-spin valve read back signal. FIGS. 17A and 17B illustrate the results from a short bump type defect on the disk's surface. The read back signal exhibits mass-spin valve with no MR magnetic modulation signal present from the defect's edges, but the characteristic mass spin-valve signal of a bump.

Figure 18A:
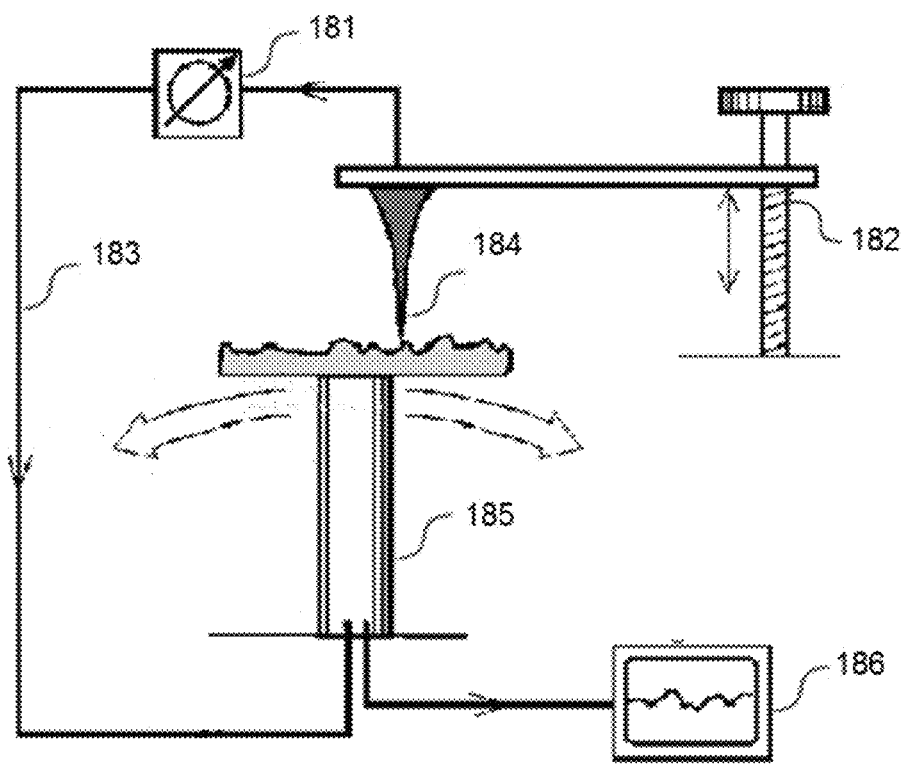
FIG. 18A illustrates a diagram of an atomic force microscope assembly wherein 181 means of sensing the vertical position of the tip; 182 a coarse positioning system to bring the tip in to the general vicinity of the sample; 183 a feedback system to control the vertical position of the tip; 184 a probe tip; 185 a Piezo-electric scanner which moves sample under the tip (or the tip over the tip over the sample) in a raster pattern; 186 a computer system that drives the scanner, measures data and converts the data into an image and 18B is the AFM profile of the calibration pit used to determine the exact dimensions of the calibration pit.
Figure 18B:
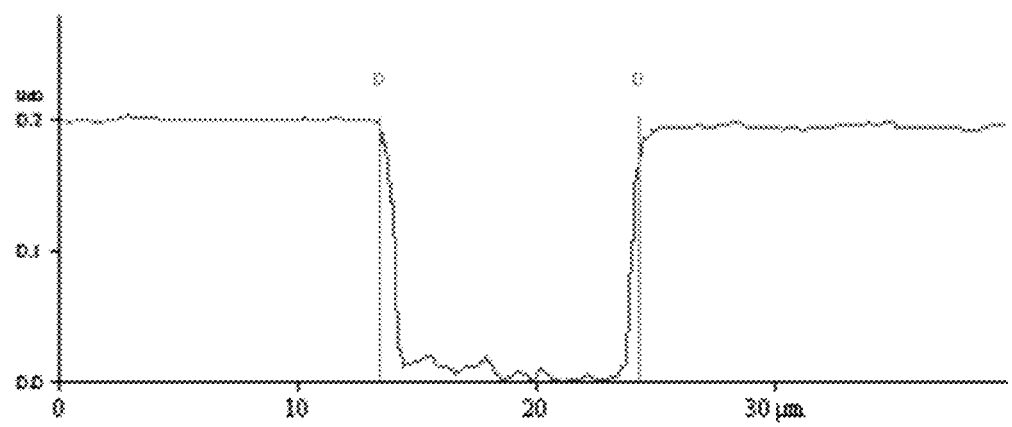
Figure 19A:
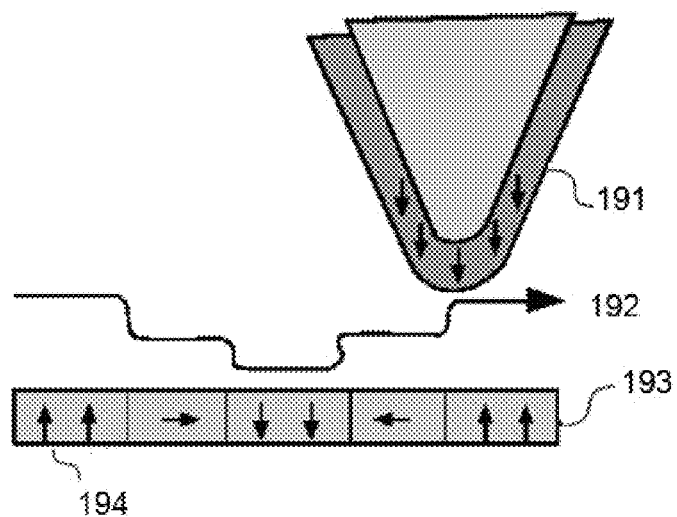
FIG. 19A illustrates a diagram of a magnetic force microscope cantilever wherein 191—magnetically coated tip, 192 path of cantilever, 193—flat magnetic sample, and 194—magnetic domains, and 19B the MFM profile of the calibration pit used to determine the exact gravitomagnetic force magnitude of the calibration pit.
Figure 19B:
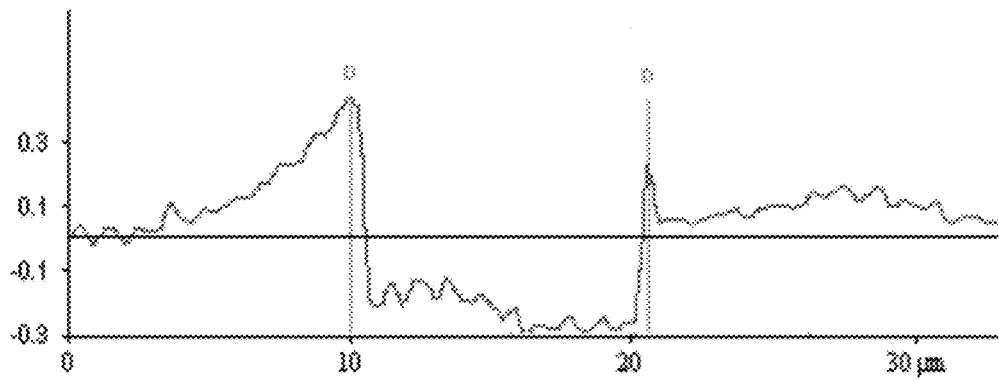

FIG. 18A illustrates a diagram of an atomic force microscope assembly. FIG. 18B is the AFM profile of the calibration pit used to the exact dimensions of the calibration Nano-pit in this product/device. Atomic force microscopies (AFMs) are a family of instruments used for studying surface properties of materials from the atomic to the micron level. All AFMs contain the components illustrated in FIG. 18A illustrates the atomic force microscope (AFM) probes the surface of a sample with a sharp tip, a couple of microns long and often less than 100 Å in diameter. The tip is located at the free end of a cantilever that is 100 to 200 μm long. Forces between the tip and the sample surface cause the cantilever to bend, or deflect. A detector measures the cantilever deflection as the tip is scanned over the sample, or the sample is scanned under the tip. The measured cantilever deflections allow a computer to generate a map of surface topography. AFMs can be used to study insulators and semiconductors as well as electrical conductors. Several forces typically contribute to the deflection of an AFM cantilever. The force most commonly associated with atomic force microscopy is an inter-atomic force called the van der Waals force. FIG. 18B illustrates the 2-D cross section of a 10 μm×10 μm 200 nm deep Nano-pit measured with an AFM FIG. 19A illustrates a diagram of a magnetic force microscope cantilever, and FIG. 19B shows the MFM profile of the calibration pit used to determine the exact gravitomagnetic force magnitude of the calibration Nano-pit in this product/device. Magnetic force microscopy (MFM) provides a 3-D profile of the spatial variation of magnetic forces on a sample surface. For MFM, the tip is coated with a ferromagnetic thin film. The system operates in non-contact mode, detecting changes in the resonant frequency of the cantilever induced by the magnetic field's dependence on tip-to-sample separation. (See FIG. 19A) MFM can be used to image naturally occurring and deliberately written domain structures in magnetic materials. FIG. 19B illustrates the Magnetic Force Microscope (MFM) 2-D cross section used for a control measurement using a ~200 nm deep ~10 μm×10 μm Nano-pit in this product/device as shown.

Possible applications to this invention are as follows:

1. Calibration Disk Standards for manufacturing purposes traceable to the National Institute of Standards and Technology requirements. Quality control for high density recording requires that the computer's hard disk surface be free of defects larger than 1 μm×1 μm in areal size or better. Current methods for characterizing defects of this size are limited by slow metrology techniques such as Atomic Force Microscopy (AFM), the associated Magnetic Force Microscopy (MFM), or faster techniques like Piezoelectric (PZT) Glide. Another faster defect detection technique that uses spin stands such as magnetic certification testers that detect missing pulses at high frequency write and read rates (i.e. Phase Metrics MG250 a type of hard disk certifier).

2. Power generation using gravitational induction as the power source.

3. 5 μin stand and mass spin-valve time band-gap based clocks to set Earth Gravity Standards for Time 4. Transportation devices using mass-spin valve gravity rectification for propulsion.

5. Teleportation devices using mass-spin valve gravity rectification that converts electromagnetism with mass-energy; using quantum entanglement; into electromagnetism; and back into mass-energy; so as to transport matter and energy to another distant location without alteration.

While the invention has been described in connection with what are presently considered to be the most practical and preferred embodiments, it is to be understood that the invention is not limited to the disclosed embodiments, but rather as intended to cover various modifications and equivalent arrangements which are included within the spirit and scope of the following claims:

I claim:

1. A device to produce gravitomagnetic induction comprising:
    a) a computer hard disk ("disk"), the disk comprising a plurality of nano-feature defects a plurality of nanobumps of specified height and a plurality of nano-pits of specified depth on a disk a few millimeters apart on a pre decided radius;
    b) a GMR read head;
    c) means to accept electrical power, the means to accept electrical power coupled with the GMR head; and
    d) means to rotate the computer hard disk relative to the GMR head at a constant linear velocity of about 500 inches per second when a GMR resistor of the GMR read head is at a constant DC bias of about 16 mA, wherein an MR element of the GMR read head is around 10 μm long and 10 nm wide and the GMR head is positioned vertically approximately 51 nm [2 μinches] over the surface of the disk.

2. The device of claim 1, wherein the disk is a 2400 Oe 31.5 mil 95 mm computer media disk.

3. The device of claim 1, wherein the plurality of defects comprise at least seven bumps of approximately 1.25 μin (.about.32 nm) height and at least seven pits of approximately 2 μin (.about.51 nm) deep and spaced approximately 50 mils apart on a radius of the disk.

4. The device of claim 1, wherein a specified area dimensions of Nano-bumps and Nano-pits are at least one defect of the plurality of defects is selected from the area dimension group consisting of area squares of 40 μm.times.40 μm, 20μm.times.20μm, 10 μm.times.10 μm, 6μm.times.6μm, 4μm.times.4 μm, 2 μm.times.2 μm and 1 μm.times.1μm.

5. The device of claim 1, wherein power is induced on the GMR read head by the presence or the absence of matter on a spinning disk.

6. The device of claim 1, wherein spinning of the disk by the rotating means produces mechanical and electrical energy.

7. The device of claim 1, wherein the device is adapted to capture electrical energy via the GMR read head from at the least one rotating hard disk surface having defects organized by type and size along a direction of rotation of the disk as driven by the rotating means and utilizing Nano-bumps or Nano-pits on the spinning at least one disk surface.

8. The device of claim 1, wherein the disk produces when driven by the rotating means both gravitational and anti-gravitational induction, and associated gravitational frame dragging.

9. A method of producing gravitomagnetic induction comprising;
   a) providing a device adapted to produce gravitomagnetic induction, the device comprising:
      i.) a computer hard disk ("disk"); and
      ii.) a GMR read head in combination with a hard disk drive's electronics;
   b) fabricating a plurality of nano-feature defects on the disk using a Focused Ion Beam (FIB) by depositing a plurality of nanobumps of specified height and etching a plurality of nanopits of specified depth on a disk a few mils or mm apart on a pre decided radius; and
   c) spinning the nano-feature defects and the disk at a constant linear velocity of about 500 inches per second when a GMR resistor of the GMR read head is at a constant DC bias of about 16 mA, wherein an MR element of the GMR read head is around 10 µm long and 10 nm wide and the GMR head is positioned vertically approximately 51 nm [2 µinches] over the surface of the spinning disk.

10. The method of claim 9, wherein fourteen defects are fabricated on a 2400 Oe 31.5 mil 95 mm disk using a Focused Ion Beam (FIB).

11. The method of claim 9, wherein at least seven bumps of .about.1.25 µin (.about.32 nm) height are deposited, and at least seven pits .about.2 µin (.about.51 nm) deep are etched, on a disk 50 mils (.about.1.27 mm) apart on a disk radius.

12. The method of claim 9, wherein specified area dimensions of at least one defect of the plurality of defects is selected from the area dimension group consisting of 40µm.times.40µm, 20µm.times.20µm, 10µm.times.10µm, 6µm.times.6µm, 4µm.times.4µm, 2µm.times.2µm and 1µm.times.1µm area squares.

13. The method of claim 9, wherein the plurality of defects of the spinning disk results in the production of mechanical and electrical energy for work and power.

14. The method of claim 9 is adapted to produce a gravitomagnetic signal and/or associated mechanical force for general use for surface characterization work and power is produced by the presence or the absence of matter on a spinning disk.

15. The method of claim 9, wherein the device is adapted to characterize disk surfaces for defects by type and size along the direction of rotation of the disk, utilizing Nano-bumps or Nano-pits on a spinning disk surface.

16. The method of claim 9, wherein the plurality of defects as fabricated enable on a spinning of the disk production of both gravitational and anti-gravitational induction, and associated gravitational frame dragging.

17. The device of claim 1, further comprising a piezoelectric glide head coupled with the rotating means.

* * * * *